United States Patent [19]
Uematsu

[11] Patent Number: 5,269,201
[45] Date of Patent: Dec. 14, 1993

[54] AUTOMOTIVE AUTOMATIC TRANSMISSION STRUCTURE

[75] Inventor: Yuichi Uematsu, Fuji, Japan

[73] Assignee: JATCO Corporation, Fuji, Japan

[21] Appl. No.: 942,837

[22] Filed: Sep. 10, 1992

[30] Foreign Application Priority Data

Sep. 13, 1991 [JP] Japan .................. 3-234675

[51] Int. Cl.$^5$ .............................................. F16H 35/00
[52] U.S. Cl. .................... 74/606 R; 192/30 W
[58] Field of Search ............ 74/606 R; 192/30 W; 73/493; 340/936

[56] References Cited

U.S. PATENT DOCUMENTS

| | | | |
|---|---|---|---|
| 4,261,227 | 4/1981 | Yamamori et al. | 74/606 R X |
| 4,679,450 | 7/1987 | Hayakawa et al. | 475/120 X |
| 4,952,200 | 8/1990 | Ohkawa | 74/606 R X |
| 5,058,718 | 10/1991 | Tojima et al. | 192/30 W |
| 5,087,231 | 2/1992 | Yamaguchi et al. | 74/606 R X |
| 5,105,686 | 4/1992 | Onuma et al. | 74/606 R |

FOREIGN PATENT DOCUMENTS

| | | | |
|---|---|---|---|
| 2362307 | 4/1978 | France | 192/30 W |
| 279138 | 11/1989 | Japan | 74/606 R |
| 823694 | 4/1981 | U.S.S.R. | 192/30 W |

OTHER PUBLICATIONS

"Electronically Controlled 4-Speed Automatic Transmission", Mitsubishi Juukou Gihou, vol. 21, No. 1, pp. 1-2, 1984.

*Primary Examiner*—Leslie A. Braun
*Assistant Examiner*—Ryan W. Massey
*Attorney, Agent, or Firm*—Foley & Lardner

[57] ABSTRACT

In an an automatic transmission, a low and reverse brake is arranged radially outward of a high clutch. The gripping plates of the low and reverse brake are arranged axially offset from the high clutch such that a diameter of the transmission is kept small. A piston of the low and reverse brake is associated with the gripping plates by way of arm members having cutout portions therein to allow a sensor, which penetrates the transmission casing in the vicinity of the low and reverse brake, access to a clutch drum of the high clutch so as to sense a rotation speed on an input shaft to which the high clutch is connected.

4 Claims, 8 Drawing Sheets

|  | REV/C | HIGH/C | LOW/C | L&R/B | LOW O.W.C | BAND/B |
|---|---|---|---|---|---|---|
| 1st |  |  | ○ | ◌ | ◉ |  |
| 2nd |  |  | ○ |  |  | ○ |
| 3rd |  | ○ | ○ |  |  |  |
| 4th |  | ○ |  |  |  | ○ |
| REV | ○ |  |  | ○ |  |  |

AUTOMOTIVE AUTOMATIC TRANSMISSION STRUCTURE

BACKGROUND OF THE INVENTION

1. Field of the Invention

The present invention relates generally to an automatic transmission arrangement for automotive vehicles. Particularly, the present invention relates to an automotive automatic transmission in which efficient use of space is utilized for reducing a necessary size of the transmission and in which a sensor may be installed without interference from transmission elements.

2. Description of the Prior Art

In control of a modern automotive automatic transmission, generally a rotational speed of an input shaft and an output shaft thereof are monitored by sensors. The output shaft rotational speed may be monitored at a location outside of the transmission and the input shaft rotation is generally monitored at a location within the automatic transmission.

An example of such a conventional automatic transmission employing rotational sensors is disclosed in Mitsubishi Juukou Gihou (Mitsubishi Industrial Technique) Vol. 21 No. 1 (1984 by Mistubishi Industrial Company Publications) wherein an input shaft of the automatic transmission rotates in connection with a clutch drum. According to this disclosure, a brake band is wound around the outer circumference of the clutch drum and a rotational sensor for detecting rotation of the drum is positioned adjacent the brake band. According to the above, since the rotational sensor must be positioned so as not to interfere with the brake band, i.e. adjacent the brake band, the transmission becomes large in an axial direction thereof.

In modern automotive technology, it has been required to reduce the size on an automatic transmission.

SUMMARY OF THE INVENTION

It is therefore a principal object of the present invention to overcome the drawbacks of the prior art.

It is a further object of the present invention to provide an automatic transmission which may be designed to be shorter in an axial dimension than conventional automatic transmissions.

In order to accomplish the aforementioned and other objects, an automatic transmission is provided, in which a rotatable member is provided with a brake mechanism arranged at an outside portion thereof, a sensor is arranged so as to detect rotation of the rotatable member, and a portion of the brake mechanism is formed with an opening for permitting access of the sensor to the rotatable member, the sensor being mounted disposed in the opening.

According to another aspect of the invention, an automatic transmission is provided including: a transmission casing; a high clutch; a low and reverse brake arranged radially outward of the high clutch, the low and reverse brake including a clutch plate assembly which is axially offset from the high clutch toward a central area of the transmission casing, piston, and an arm member, the arm member including a cut out portion; and a sensor, the sensor detecting a rotational speed of a clutch drum of the high clutch and penetrating the transmission casing at a location corresponding to the cut out portion of the arm member of the low and reverse brake.

DESCRIPTION OF THE PREFERRED EMBODIMENT

Figure 1:
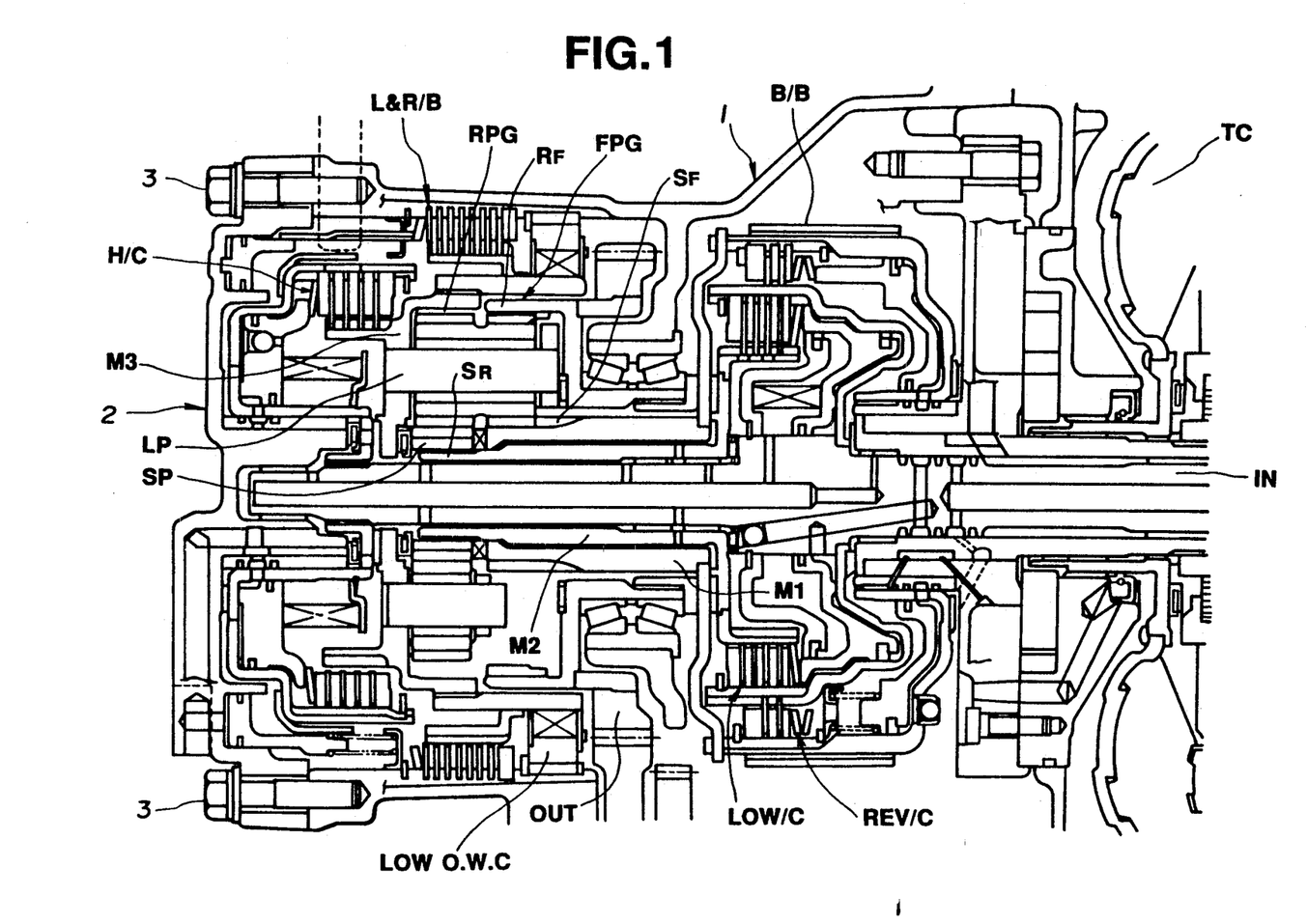
FIG. 1 is a cross-sectional view of an automatic transmission according to the invention.

Referring now to the drawings, particularly to FIG. 1, an automatic transmission includes a torque converter TC, a transmission casing 1, and a side cover 2. Further, the side cover 2 is attached to the transmission casing 1 by a plurality of bolts 3.

In addition, the automatic transmission has an input shaft IN, and an output gear OUT. Arranged between the input shaft IN and the output gear OUT, a forward planet gear FPG and a reverse planet gear RPG, are provided for achieving four forward driving speeds and one reverse speed. For engine braking control, a reverse clutch REV/C, a band brake B/B, a low clutch LOW/C, a low and reverse brake L&R/B, a high clutch H/C, a low one-way clutch LOW O.W.C are provided and, connected to the input shaft IN and the output gear OUT, rotatable members M1, M2 and M3 are provided.

The above-mentioned forward and reverse planet gears FPG and RPG are arranged in one planetary gear set. The third rotatable member M3 supports a short pinion SP and a long pinion LP so as to be freely rotatable. The forward planet gear FPG engages the long pinion LP and a forward sun gear SF and a forward ring gear RF engages the output gear OUT. Further, the reverse planet gear RPG engages the short pinion SP and a reverse sun gear SR.

Further to say, the above-mentioned first rotatable member engages the forward sun gear SF and the second rotatable member engages the reverse sun gear SR. The reverse clutch REV/C engages the first rotatable member M1 with the input shaft IN in an interruptable fashion, and the band brake B/B interruptably connects the first rotatable member M1 with the transmission casing 1.

The low clutch LOW/C interruptably connects the second rotatable member M2 with the input shaft IN.

The low and reverse brake L&R/B and the low one-way clutch LOW O.W.C are arranged adjacently and may interruptably connect the third rotatable member M3 with the transmission casing 1, and the high clutch H/C interruptably connects the third rotatable member with the input shaft IN.

Hereinbelow the structure of the embodiment will be explained in detail with reference to the enlarged cross-sectional diagram of FIG. 2.

The side cover 2 has a support portion 2a, for supporting a clutch drum 4a of the high clutch H/C, and a cylinder chamber 2b, the cylinder chamber 2b is formed radially outward of the support portion 2a. The accommodating portion 2a supports the piston 4b of the high clutch drum 4a in relatively rotatable fashion.

The low and reverse brake L&R/B includes brake plates 5a and 5b, a piston 5c and a return spring 5d. In the low and reverse brake L&R/B, both brake plates 5a and 5b are alternately arranged at a center position between the high clutch H/C and the transmission casing 1 such that the brake plate 5a is connectable to the transmission casing 1 and the other brake plate 5b is connectable to a hub 6 provided on the third rotatable member M3. Further, the piston 5c is hydraulically operated to engage both brake plates 5a and 5b for moving in the axial direction within chamber 2b provided on the inner face of the side cover 2. In addition, a plurality of arm portions 5e are attached to the piston 5c for pushing against the brake plates 5a and 5b. Between the arm portions 5e, the return spring 5d is provided for applying return force against the pushing of the arm portions 5e. One end of the return spring 5d is installed at the piston 5c while the other end thereof is is seated on a spring seat 5f. A stopper 1a is provided in the transmission casing 1 or regulating movement of the spring seat in the longitudinal direction of the return spring 5d.

Also, the chamber 2b on the inner face of the side cover 2 includes a groove 2c therein corresponding to a projection 5g of the piston 5c for regulating movement of the piston 5c.

Figure 2:
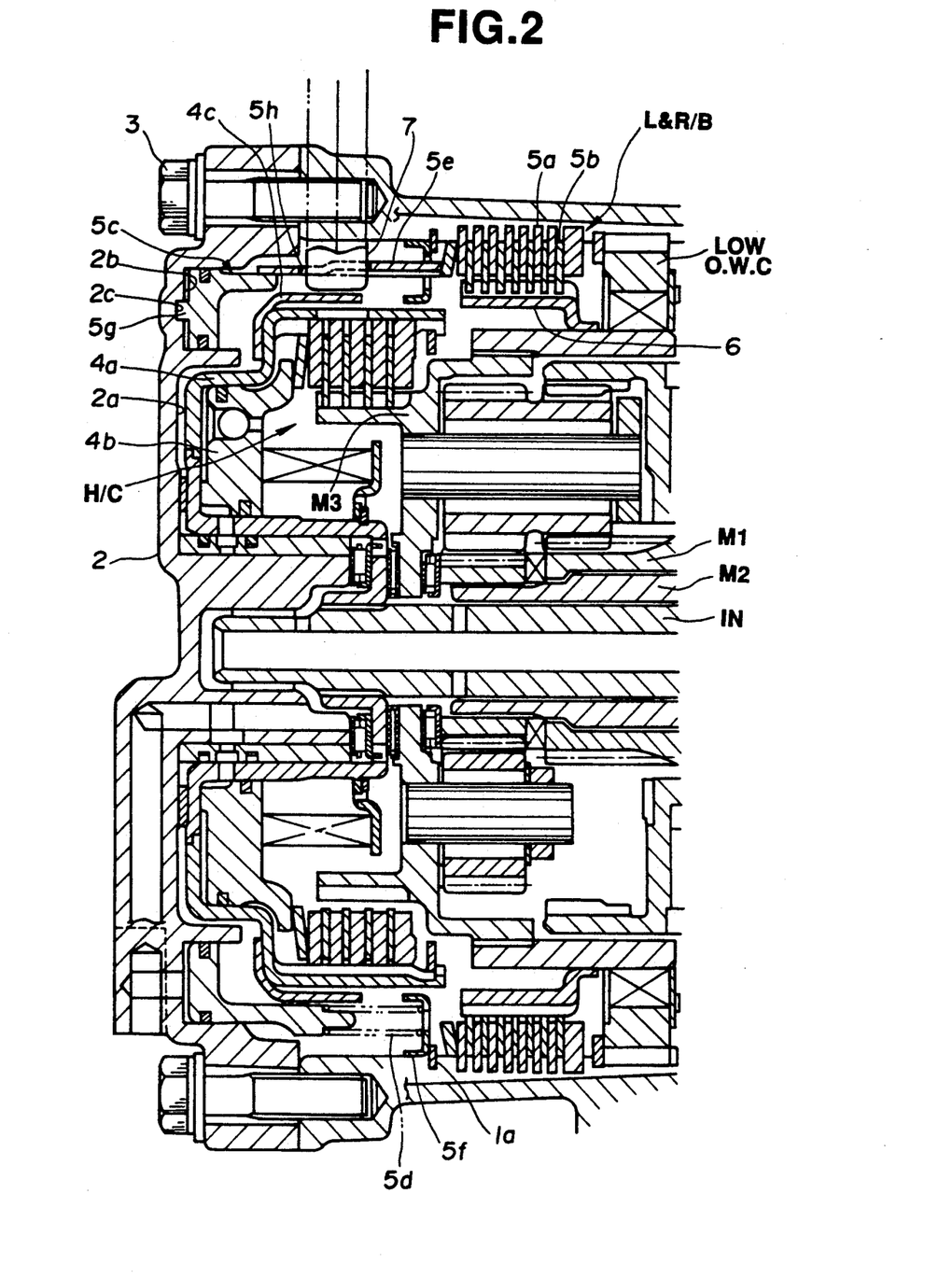
FIG. 2 is a magnified cross-sectional view of a main portion of the transmission of FIG. 1.

Furthermore, as seen in FIG. 2, a sensor 7 is provided so as to penetrate the transmission casing 1 for detecting a rotational speed of the input shaft IN. The arm portions 5e are provided cutouts 5h for permitting access of the sensor 7. The input shaft IN is connected by splines to the clutch drum 4a of the high clutch H/C. A sensor plate 4c is attached to the clutch drum 4a for detection by the sensor 7. The sensor plates 4c is attached to the outer circumference of the clutch drum 4a in order to give an uneven, or toothed shape to the clutch drum 4a for aiding in rotational detection by the sensor 7.

Figure 3:
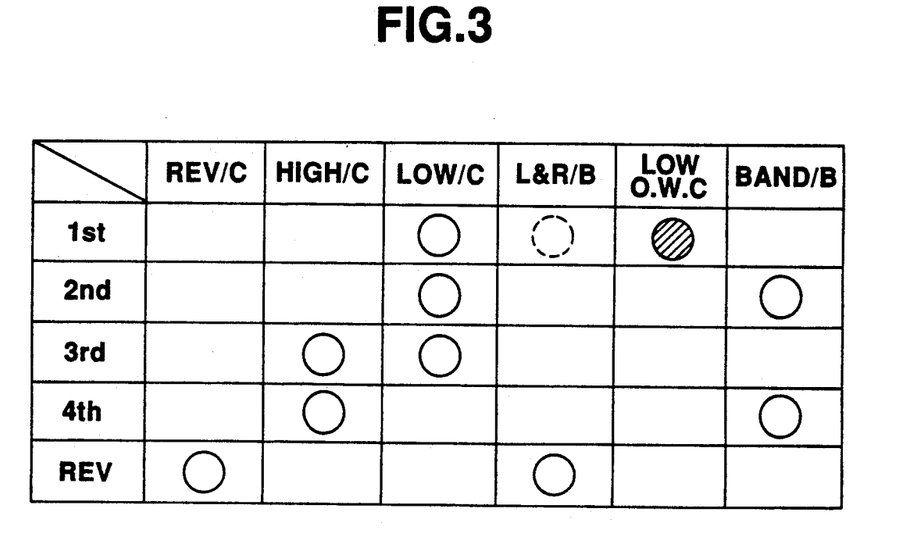
FIG. 3 is a chart showing clutch and brake engagement in relation to transmission gear.
Figure 4:
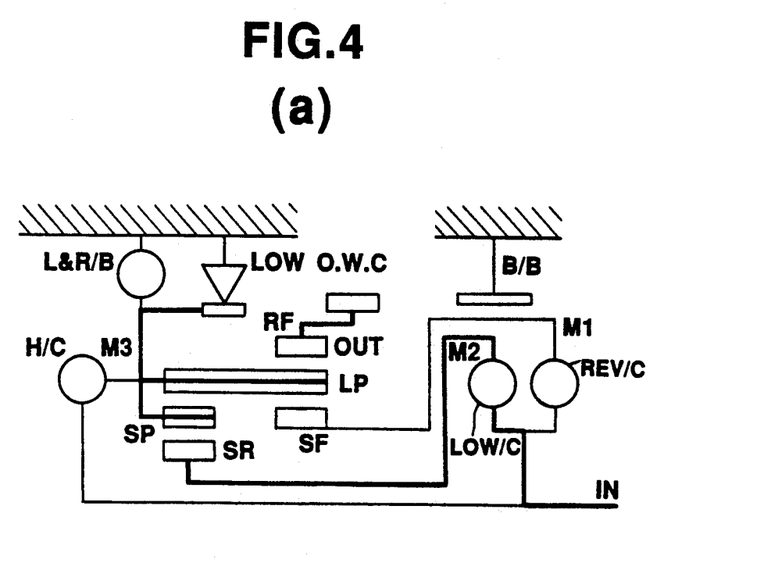
FIG. 4(a) is a schematic diagram showing connection of elements in an automatic transmission according to the invention in a first gear range.
FIG. 4(b) is a graph showing characteristics in the gear range of FIG. 4(a)
Figure 5:
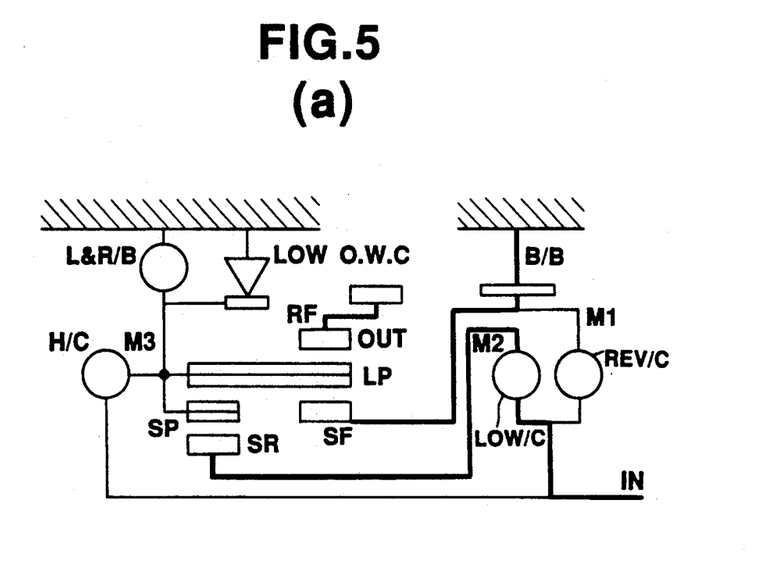
FIG. 5(a) is a schematic diagram showing connection of elements in an automatic transmission according to the invention in a second gear range.
FIG. 5(b) is a graph showing rotational characteristics in the gear range of FIG. 5(a)
Figure 6:
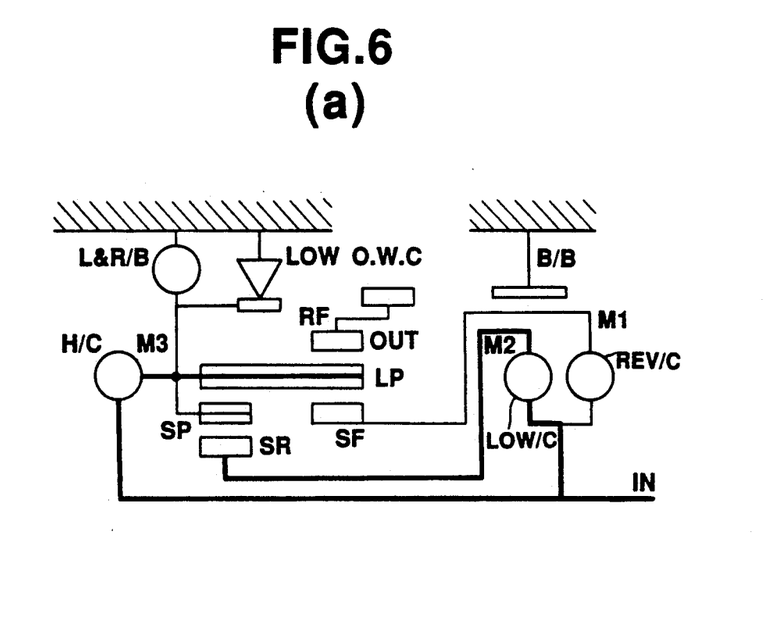
FIG. 6(a) is a schematic diagram showing connection of elements in an automatic transmission according to the invention in a third gear range.
FIG. 6(b) is a graph showing rotational characteristics in the gear range of FIG. 6(a)
Figure 7A:
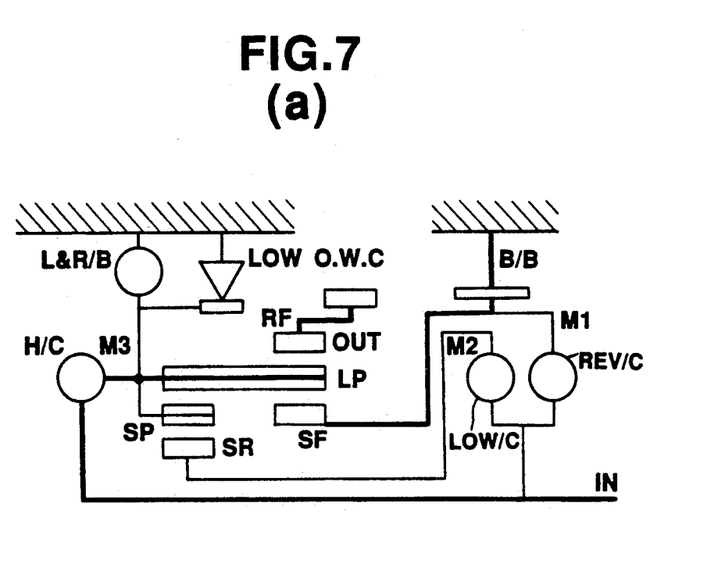
FIG. 7(a) is a schematic diagram showing connection of elements in an automatic transmission according to the invention in a fourth gear range.
Figure 7B:
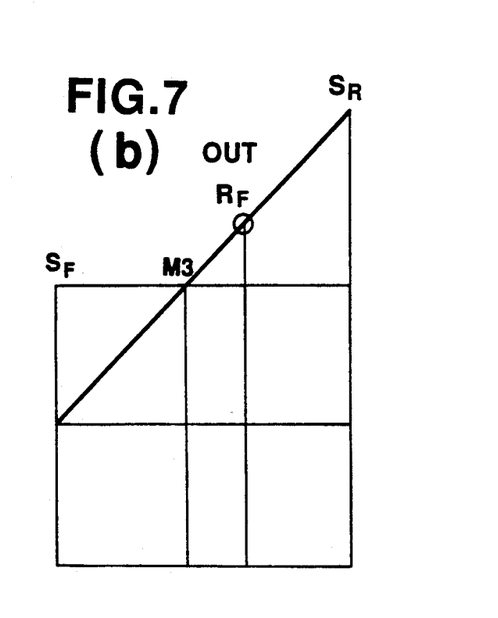
FIG. 7(b) is a graph showing rotational characteristics in the gear range of FIG. 7(a)
Figure 8:
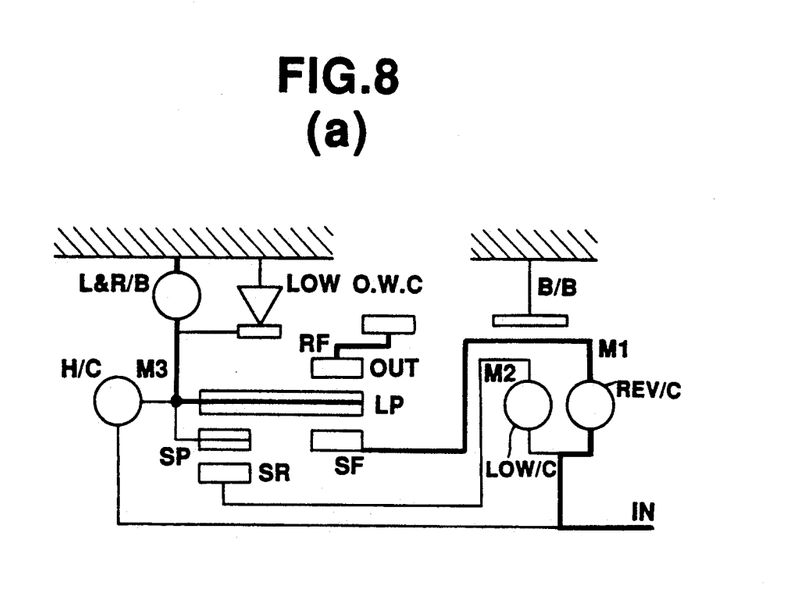
FIG. 8(a) is a schematic diagram showing connection of elements in an automatic transmission according to the invention in a reverse gear range.
FIG. 8(b) is a graph showing rotational characteristics in the gear range of FIG. 8(a).

Hereinbelow, the engagement of elements of an automatic transmission according to the present invention will be explained for each gear range, with reference to FIG. 3.

First, when the transmission is in a first gear range, the low clutch LOW/C is engaged. Also, under acceleration in the first gear range, the low one-way clutch LOW O.W.C is further engaged (shown as a shaded circle in FIG. 3), and an under engine braking condition in the first gear range, the low and reverse brake L&R/B is also engaged (dotted circle in FIG. 3).

In the second gear range of the transmission according to the present invention, the low clutch LOW/C and the band brake B/B are engaged.

In the third gear range of the transmission, the high clutch H/C and the low clutch LOW/C are active.

In the fourth gear range, the high clutch H/C and the band brake B/B are utilized.

Further, in the reverse gear range of the automatic transmission of the invention, the reverse clutch REV/C and the low and reverse brake L&R/B are brought into engagement.

FIGS. 4–8(a) are schematic diagrams outlining the engagement of transmission elements for each of the four gear ranges and the reverse gear range. FIGS. 4–8(b) are graphs showing rotational characteristics of transmission transmission elements and an output rotation thereof.

Hereinbelow, the special features of the automatic transmission of the invention will be enumerated in detail.

Since the low and reverse brake L&R/B is provided at an outer periphery of the transmission housing, an axial dimension of the transmission may be reduced. Further, the piston 5c supported by arm portions 5e including a cut-out 5h, is provided in the vicinity of the sensor 7, and includes a projection portion 5g corresponding to a guide groove 2c provided in the chamber 2b at the inner face of the side cover 2, thus, motion of the piston is regulated and interference between the piston 5c, of the low and reverse brake L&R/B, and the sensor 7, penetrating the transmission casing 1, does not occur.

According to the invention, the low and reverse brake L&R/B is provided radially outward of the high clutch H/C and an support portion 2a, for the clutch drum 4a, and a cylinder chamber 2b, for the piston 5c of the low and reverse brake L&R/B, are provided integrally formed in the inner face of the side cover 2. Further, the plates 5a and 5b of the low and reverse brake L&R/B are provided at a location axially inward of the high clutch H/C. Thus, efficient use of the internal space of the automatic transmission according to the invention is realized and, since the side cover 2 serves additionally as a cylinder chamber 2b and a support portion 2a reduction in the axial dimension of the transmission can be achieved.

In addition, since the piston 5c of the low and reverse brake L&R/B is provided substantially radially outward of the outer circumference of the high clutch H/C, reduction in the diameter of an automatic transmission according to the invention can be accomplished.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. In an automotive automatic transmission, a rotatable member is provided with a brake mechanism arranged at an outside portion thereof, a sensor is arranged so as to detect rotation of said rotatable member, a portion of said brake mechanism being formed with an opening for permitting access of said sensor to said rotatable member, said sensor being mounted disposed in said opening.

2. An automatic transmission as set forth in claim 1, wherein said rotatable member is a high clutch and said brake mechanism is a low and reverse brake.

3. In an automatic transmission:
a transmission casing;
a high clutch;
a low and reverse brake arranged radially outward of said high clutch, said low and reverse brake including a clutch plate assembly which is axially offset from said high clutch toward a central area of said transmission casing, piston, and an arm member, said arm member including a cut out portion; and
a sensor, said sensor detecting a rotational speed of a clutch drum of said high clutch and penetrating said transmission casing at a location corresponding to said cut out portion of said arm member of said low and reverse brake.

4. An automatic transmission as set forth in claim 3, wherein a plurality of said arm portions is provided.

* * * * *